UNITED STATES PATENT OFFICE.

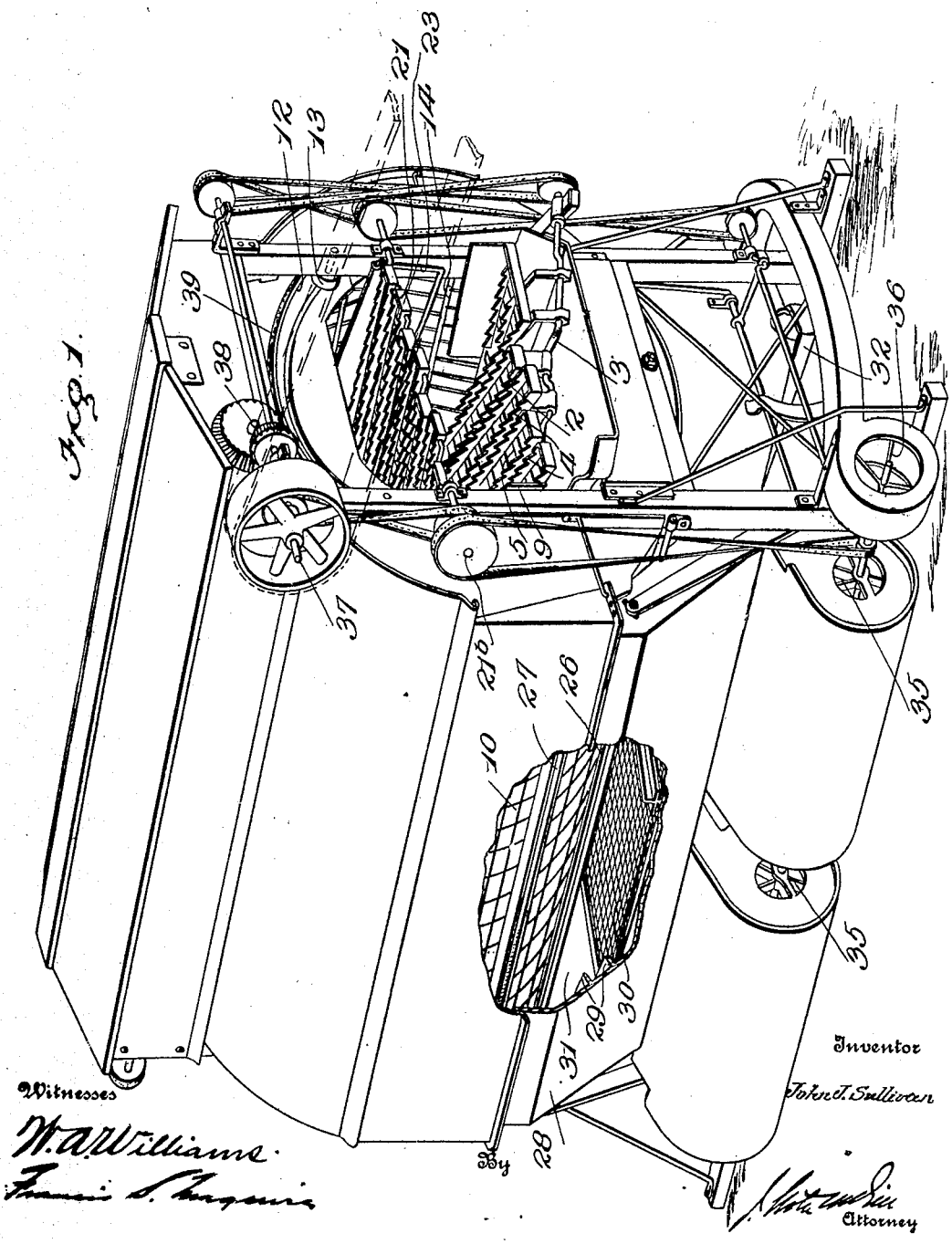

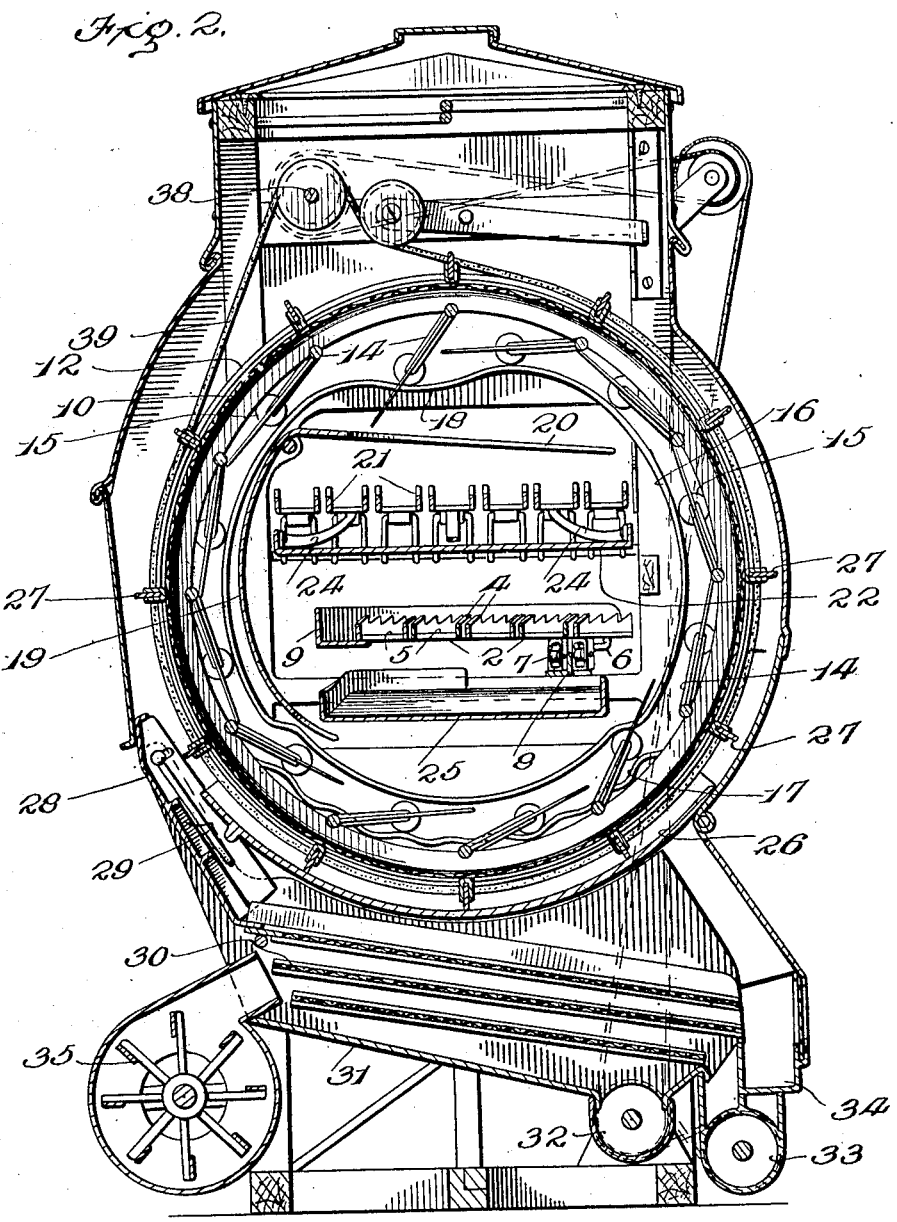

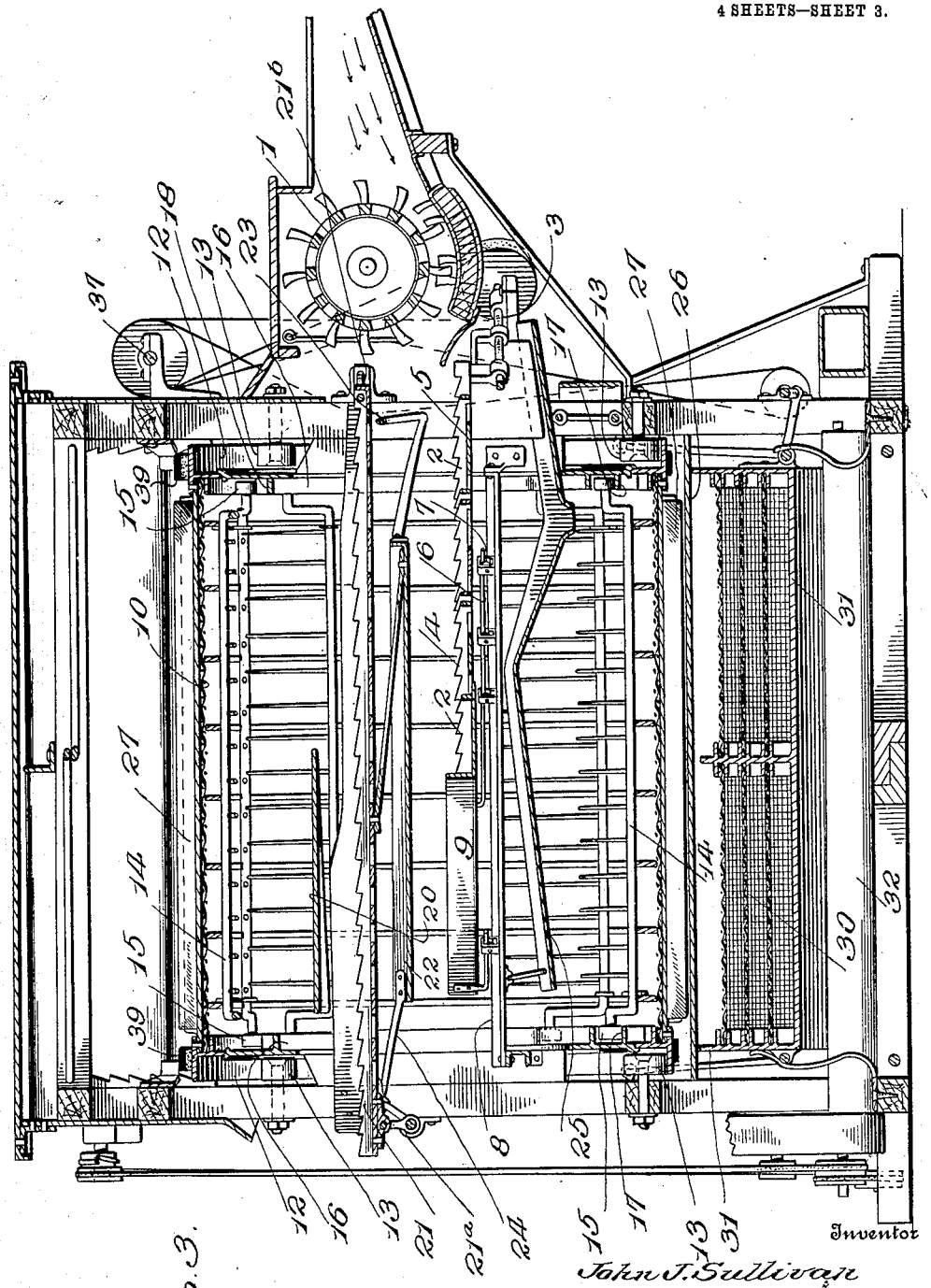

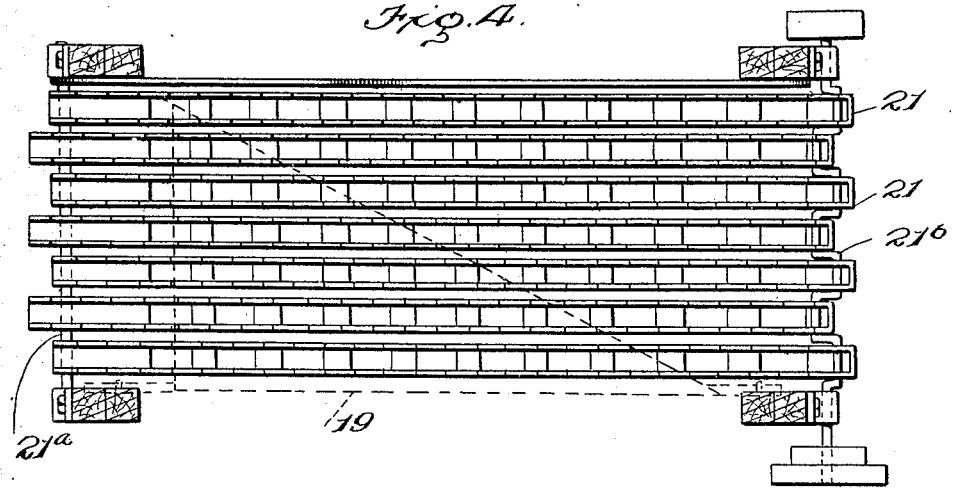
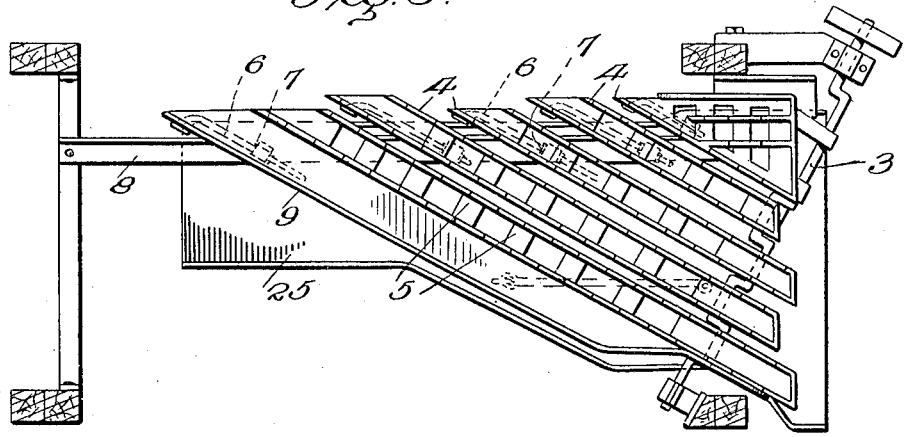
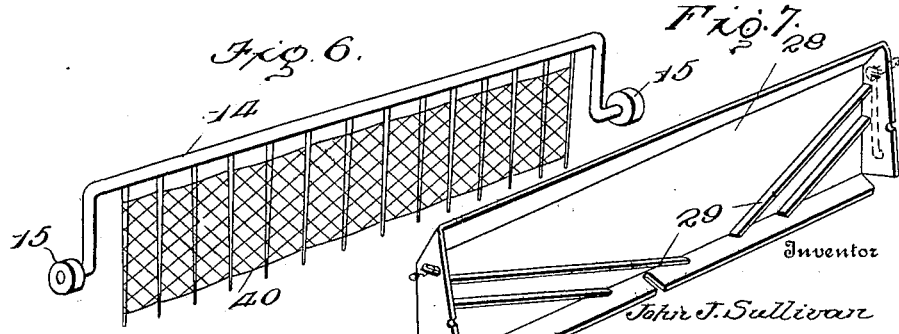
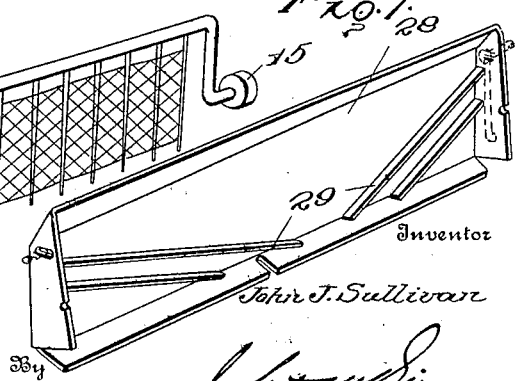

JOHN J. SULLIVAN, OF COLLIS, MINNESOTA.

THRESHING-MACHINE.

No. 916,216.  Specification of Letters Patent.  Patented March 23, 1909.

Application filed April 18, 1908. Serial No. 427,817.

*To all whom it may concern:*

Be it known that I, JOHN J. SULLIVAN, of Collis, in the county of Traverse and State of Minnesota, have invented certain new and useful Improvements in Threshing-Machines; and I do hereby declare the following to be a full, clear, and exact description of the invention, such as will enable others skilled in the art to which it appertains to make and use the same.

The primary object of this invention is to provide simple and highly-efficient means for insuring the thorough separation of grain from straw, chaff, etc., the straw being repeatedly agitated and turned over during the passage thereof through the machine.

The invention will be hereinafter fully set forth and particularly pointed out in the claims.

In the accompanying drawings, Figure 1 is a view in perspective, with parts broken away. Fig. 2 is a transverse sectional view. Fig. 3 is a longitudinal sectional view. Figs. 4 and 5 are plan views of the two series of walking rakes. Fig. 6 is a detail view in perspective of one of the circularly-arranged straw carriers and agitators. Fig. 7 is a similar view of the grain guiding plate.

Referring to the drawings, 1 designates a threshing cylinder which is suitably mounted at one end of the main frame; 2 a series of walking rakes for carrying and agitating the straw, said rakes being horizontally-arranged within the machine and connected at their front ends to a crank-shaft 3 by which they are given a constant reciprocation. Each rake is preferably composed of two spaced-apart toothed bars 4 connected by spaced-apart cross bars 5 through which the grain may fall. These rakes are diagonally-arranged within the machine, their discharge ends being extended toward one side thereof. In consequence no two of these rakes are of the same length. On their under sides they have depending arms 6 which rest upon rollers 7 supported by frame bar 8, and the innermost or longest rake of the series carries a vertically disposed guide plate 9 for insuring the passage of the straw to the side of the machine. This series of walking rakes not only agitates the straw to effect the separation of the grain, but it evenly distributes the straw at one side of the machine, approximating the length thereof.

10 designates a drum or cylinder suitably mounted within the main frame and extending approximately the full length thereof. This drum, which is shown as of open-work formation, being composed of suitably-braced wire-mesh, or perforated sheet-metal, has at its ends rings or flanges 12 which engage friction rolls 13 mounted on the frame.

14 designates a series of circularly-arranged carriers by which the straw is made to travel with the drum and during such travel it is agitated to remove the grain. These carriers comprise pivot-bars having tines or beater arms projecting laterally therefrom. Each pivot-bar is hung in the ends of the drum, and its ends are cranked and carry rollers 15 which travel in stationary tracks 16 located within the opposite ends of the drum. These tracks in their bottom portions have each a series of cams or ridges 17 to effect the constant vibration of each carrier as its frictional rollers engage therewith. At the top each track 16 is dipped or downwardly curved, as at 18, to permit the several carriers to drop or open inwardly. The straw as it is discharged from the walking rakes 2 falls upon the revolving carriers and as the straw travels therewith it is thoroughly agitated or shaken by the rapid vibrations of the carriers when passing over the lowest point of travel. The straw is then carried upon the outside of a shield 19 and deposited on a shield or deflector 20 as the several carriers open inwardly. This shelf or deflector is slightly inclined, and is wider at one end than at the other.

21 designates a second series of walking rakes which, like the first described series, is located within the drum and hence surrounded by the revolving series of carriers. These walking rakes 21, however, differ from the walking rakes 2 in that they are extended longitudinally through the machine on straight lines, but on an incline so that the straw thereon will be discharged at the rear of the machine where it may be taken care of by a pneumatic stacker, or other suitable means, not shown. The straw is further agitated to effect the separation of the grain by the action of the upper set of walking rakes, which latter are supported at their rear ends by pivoted bearings 21ª and at their front ends by a crank-shaft 21ᵇ. These rakes 21 in taking up the straw as it comes from deflector 20, and feeding the same rearward beneath the latter, effect the third turning thereof, the first turning being accomplished by the transfer of the straw from walking rakes 2 and the second by the deposit of the straw on the deflector.

From the described arrangement it will be understood that the straw after leaving the threshing cylinder is first acted upon by the series of diagonally-arranged walking rakes and from them is taken up and inverted by the revolving carriers, which thoroughly beat or agitate the straw as it passes beneath the initially-acting walking rakes; is then carried up and again inverted and discharged upon the shelf or deflector 20 and is a third time inverted as it is taken up by the second series of walking rakes before being discharged from the machine. The thorough agitation and overturning of the straw insures the separation of all the grain.

Beneath the upper series of walking rakes is a vibrating pan 22 supported at its front by hangers 23 while at its rear it is connected by arms 24 to two of the rakes. So also beneath walking rakes 2 is a vibrating pan 25. All grain will fall onto a concaved bottom 26, and from this it is removed by bars 27, arranged longitudinally, on the outside of the drum. As the grain clears the upper edge of the bottom it will fall against an outer plate or section 28 of the inclosing frame, and by guides 29 will be directed toward the rear half of a centrally-divided or two-part screen 30 mounted within a vibrating frame 31. This vibrating frame carries the usual and ordinary sieves, and in close juxtaposition thereto is arranged the grain-receiving trough 32, the trough 33 for screenings or "white caps", and the chaff-receiving trough 34. At 35 I have shown a duplex fan for effecting the separation of the chaff etc. from the grain, and at 36 the fan for ejecting the chaff, but as these form no special part of my invention it is not necessary to describe them or the means for operating them.

The particular means for actuating the walking rakes and for revolving the drum and carriers may be changed at pleasure, since it forms no part of my invention. I have shown, however, a driven shaft 37 having a beveled gear connection with a shaft 38 extended longitudinally of the machine at the top thereof for driving bands 39 which engage with the end rings of the drum. In practice I may use sprocket chains for this purpose. I have also shown the crank shafts 3 and 21$^b$ of the two series of walking rakes as being actuated by suitable belting extending from the operating shaft.

The advantages of my invention will be apparent to those skilled in the art to which it appertains. By effecting the thorough agitation and vibration of the straw, coupled with the turning of the latter over in its transit through the machine, I insure the removal of all grain from the straw. In fact the grain is so thoroughly removed by the time the straw is carried upwardly by the revolving carriers, after being acted upon by the vibrations of the latter and the first series of walking rakes, that but comparatively little grain remains in the straw when it falls onto the upper series of walking rakes.

As is shown in Fig. 6 the tines or beater arms of each of the revolving carriers may be covered by sheets 40 of wire-mesh to more thoroughly insure the separation of the grain by the agitation of the carriers.

I claim as my invention:—

1. In a threshing machine, a revolving series of circularly-arranged straw-carriers, means for agitating the straw and distributing it to said carriers, and means for agitating the straw after it is discharged from the carriers, said straw-agitating means being located within the circle of the series of carriers.

2. In a threshing machine, a series of circularly-arranged carriers, means for agitating the straw and distributing it to said carriers, such means being located within the circle of said carriers and arranged diagonally to the axis thereof, means for revolving said series of carriers, and means for agitating the straw discharged from said carriers, such latter means being also located within the circle of the carriers but substantially parallel with the axis thereof.

3. In a threshing machine, a series of circularly-arranged carriers, means within the circle of said carriers for distributing straw thereto, means for revolving said carriers, means for vibrating the latter, and means for carrying off the straw when released by the carriers.

4. In a threshing machine, a series of walking rakes for agitating and carrying the straw, circularly-arranged agitating means revoluble around said walking rakes, and a second series of walking rakes located above the first-mentioned series of rakes, and within the circle of travel of said agitating means, onto which second series straw is discharged by the latter.

5. In a threshing machine, a series of walking rakes for agitating and carrying the straw, a revolving series of circularly-arranged carriers surrounding said walking rakes, and a second series of walking rakes, located above the first-mentioned series of rakes, and onto which the straw is discharged by said carriers.

6. In a threshing machine, a series of walking rakes for agitating and carrying the straw, revolving agitators surrounding said walking rakes, which latter are arranged diagonally within the circle of travel of the agitators, and a second series of walking rakes, located above the first-mentioned series of rakes, and extended within the circle of said agitators.

7. In a threshing machine, an open-work drum, a series of carriers located within and carried by said drum, means for revolving the latter, means for vibrating the carriers during a portion of the revolution thereof, means within the drum for feeding straw to the carriers, and means also within the drum for receiving the straw from the carriers.

8. In a threshing machine, an open-work drum, a series of carriers located within and carried by said drum, means for revolving the latter, a series of walking rakes located within the drum for feeding the straw to the revolving carriers means for vibrating the latter during their revolution, a second series of walking rakes located within and longitudinally of the drum above the first-mentioned walking rakes, and means for actuating the walking rakes.

9. In a threshing machine, an open-work drum, a series of carriers located within and carried by the drum, means for revolving the latter, a bottom beneath the drum for receiving grain, means for agitating the carriers in their passage over said bottom, means for feeding straw into the drum and to said carriers, and means within the drum for receiving the straw from the carriers.

10. In a threshing machine, an open-work drum, a series of agitators located within and carried by the drum, means for revolving the latter, a concaved bottom beneath said drum-bars extending longitudinally of the latter for removing grain from said bottom, a shaking screen beneath said bottom, a guide leading to said shaking screen onto which the grain is discharged by the drum bars, means for feeding straw to the agitators, and means for receiving the straw discharged from the latter.

11. In a threshing machine, a revolving series of agitators, a circular support therefor, each agitator having a bar pivoted in said support, a track for said bars, said track having means for vibrating said agitators during their revolutions, means located within the circle of said agitators for supplying straw thereto, and straw-carrying means for receiving the straw from the agitators.

12. The combination with a drum, of a series of carriers mounted thereon, comprising each a pivoted bar having beater arms and crank arms, a track in which the arms are designed to travel, said track having in its lower portion means for vibrating the rakes, and also having in its upper portion means to effect the lowering of the carriers, means for feeding straw to the latter, and means for receiving the straw discharged therefrom.

13. The combination with a drum, of a series of carriers mounted thereon, comprising each a pivoted bar having beater arms and a wire-mesh covering therefor, and crank-arms, a track in which the crank arms are designed to travel, said track having in its lower portion means for vibrating the rakes, and also having in its upper portion means to effect the lowering of the carriers, means for feeding straw to the latter, and means for receiving the straw discharged therefrom.

In testimony whereof, I have signed this specification in the presence of two subscribing witnesses.

JOHN J. SULLIVAN.

Witnesses:
FRANCIS S. MAGUIRE,
JOHN A. MURPHY.